Patented Dec. 18, 1951

2,579,384

UNITED STATES PATENT OFFICE 2,579,384

N,N-DISUBSTITUTED VINYL DITHIO-CARBAMATES

Carleton Thomas Handy and John C. Sauer, Wilmington, Del., assignors to E. I. du Pont de Nemours & Company, Wilmington, Del., a corporation of Delaware No Drawing. Application February 24, 1950, Serial No. 146,156

9 Claims. (Cl. 260—79.7)

This invention relates to a new class of vinyl compounds, their preparation, and to polymers obtained therefrom.

The reaction of acetylene with acids in the presence of various catalysts, e. g., mercury salts, is used extensively in the preparation of vinyl esters which, in turn, are polymerized to useful resins. Vinyl esters of numerous acids have been prepared in this way but this method is not suitable for making vinyl esters of acids which are unstable.

An object of this invention is to provide a new class of vinyl esters. A further object is to provide a process of preparing vinyl esters of relatively unstable acids. Other objects will be apparent from the description of the invention given hereinafter.

The above objects are accomplished according to the present invention by reacting acetylene with a mixture of an aliphatic secondary amine and carbon disulfide under superatmospheric pressure whereby an N,N-disubstituted vinyl dithiocarbamate is formed and thereafter polymerizing the vinyl dithiocarbamate either alone or in admixture with other polymerizable compounds. Dithiocarbemic acids are relatively unstable and, hence, do not lend themselves to the conventional method of making vinyl esters mentioned above but it has been discovered that vinyl esters of these dithiocarbamic acids may be readily prepared by the novel reaction of this invention.

The N,N-disubstituted vinyl dithiocarbamates of this invention are obtained by the reaction according to the following equation:

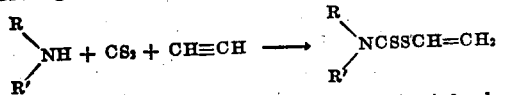

wherein R and R' represent monovalent hydrocarbon, oxahydrocarbon, or thiahydrocarbon radicals in which the carbon attached to the nitrogen is aliphatic in character, or wherein R and R' together form a divalent hydrocarbon, oxahydrocarbon, or thiahydrocarbon radical in which the two carbons attached to the nitrogen are both attached to other atoms by single bonds only.

The foregoing reaction will take place under a wide range of conditions with no special conditions necessary except, since acetylene is a gas under normal conditions and must be confined, superatmospheric pressures will be used. Conveniently, the process of this invention may be carried out by passing acetylene under moderate pressure, e. g., 100-300 lb./sq. in. into an autoclave containing approximately equimolecular amounts of the selected secondary amine and carbon disulfide, and an inert solvent for the amine such as tetrahydrofuran or dimethyl formamide under essentially anhydrous conditions. The reaction mixture is then preferably heated to 100° C.–140° C. and the acetylene pressure maintained by introducing additional acetylene as needed. After absorption of acetylene ceases, the reaction mixture is cooled, excess acetylene bled off and the contents of the autoclave are subjected to distillation. In this way the vinyl dithiocarbamate is obtained, generally in the form of a light colored liquid.

The preparation and polymerization of typical vinyl dithiocarbamates are illustrated in the following examples in which parts are given by weight unless otherwise stated, and temperatures in degrees centigrade.

Example I

Into a pressure vessel, which has been swept out with deoxygenated nitrogen, is charged 30 parts of dibutylamine, 100 parts of water, 18 parts of carbon disulfide, and 1 part of potassium hydroxide. The pressure vessel is closed, cooled in a dry ice/methanol bath, evacuated, and acetylene pressured to a total pressure of about 100 lbs./sq. in. The pressure vessel is then placed in a shaking apparatus equipped with heating coils, and the contents of the vessel heated to 130° during a period of 12 hours while acetylene is injected to maintain a pressure of 240-265 lbs./sq. in. At the end of the reaction the vessel is cooled, excess pressure is vented, and the contents discharged. The dark, oily layer is separated from the water, dried over calcium chloride, and distilled. Nine parts of a light red liquid distilling at 108–121°/2 mm. ($n_D^{25}$ 1.5453) and 2 parts of a light red liquid, B. P. 122–123°/2 mm. ($n_D^{25}$ 1.5502) are obtained. The elemental analysis for the higher boiling fraction indicates it to be the vinyl N,N-dibutyldithiocarbamate.

Anal. Calcd. for $C_{11}H_{21}NS_2$: C, 57.2; H, 9.1; S, 27.7
Found: C, 57.11; H, 9.28; S, 27.85
57.20    9.31    28.04

The foregoing example illustrates the preparation of an N,N-disubstituted vinyl dithiocarbamate in an aqueous medium. While the reaction will take place in an aqueous medium, the yield is generally relatively lower and it is preferred to carry out the reaction under substantially anhydrous conditions as illustrated in the following examples.

Example II

An oxygen-free pressure vessel is charged with 64.5 parts of dibutylamine, 38 parts of carbon disulfide, 1 part of potassium hydroxide, and 70 parts of tetrahydrofuran. The reaction mixture is agitated and heated for 9.2 hours at 130° while the pressure is maintained at 200–240 lbs./sq. in. by acetylene injection. From the dark-colored reaction mixture there is obtained by distillation 50.6 parts of a light red liquid distilling at 148°/5 mm. ($n_D^{25}$ 1.5543). The elemental analyses are similar to those described in Example I, indicating the formation of vinyl N,N-dibutyldithiocarbamate.

Found: C, 57.33; H, 9.27; S, 27.17, 27.43.

An examination of this material by infrared analyses showed characteristic absorption for the —CH=CH$_2$ group.

Two parts of this vinyl compound are heated at 90° for six hours with 0.2 part of $\alpha,\alpha'$-azobis-($\alpha,\gamma$-dimethylvaleronitrile). Upon cooling to room temperature, a viscous product is obtained, indicating that the vinyl compound has polymerized. The product has an average molecular weight of 460.

Example III

A pressure vessel is charged with 77.4 parts dibutylamine, 45.6 parts carbon disulfide, and 85 parts tetrahydrofuran. Acetylene is introduced at 210–240 lb./sq. in., while the temperature is maintained at 75°. After 6 hours reaction, the vessel is cooled, opened, and the contents distilled. This yields 3.2 parts of vinyl N,N-dibutylthiocarbamate, B. P. 134–6/2 mm. ($n_D^{25}$1.5539). The yield here is quite low as compared to Example II, showing the effect of temperature on the rate of reaction. Even though the reaction was only continued for 6 hours in this example as against 9.2 hours in Example II, the much lower relative yield in this example is primarily accounted for by use of a temperature of 75° compared to 130° in Example II.

Example IV

Into equipment similar to that described in Example I is charged 85 parts of piperidine, 76 parts of carbon disulfide, and 70 parts of tetrahydrofuran. The mixture is heated for 7.2 hours at 130–5° while the pressure is maintained at 200–240 lb./sq. in. by acetylene injection. From the reaction mixture is obtained 14.8 parts of a product distilling at 151°/8 mm. ($n_D^{25}$1.5978). This product is vinyl N,N-pentamethylenedithiocarbamate and has the formula:

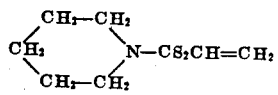

It can also be referred to as vinyl 1-piperidine-carbodithioate.

Example V

Into equipment similar to that described in Example I is charged 87.1 parts of morpholine, 76.1 parts of carbon disulfide and 120 parts of dimethyl formamide. The mixture is heated for 8.1 hours at a temperature of 135–145° while the pressure is maintained at 180–200 lb./sq. in. by acetylene injection. From the reaction mixture is obtained 15.9 parts of a product distilling at 93°/18 mm. ($n_D^{25}$1.5296). This product is vinyl N,N-oxydiethylenedithiocarbamate and has the formula:

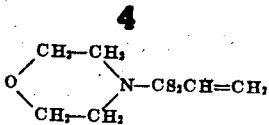

It can also be referred to as vinyl 4-morpholine-carbodithioate.

Example VI

Into the equipment described in Example I is charged 74.5 parts of dibutylamine, 38 parts of carbon disulfide and 70 parts of tetrahydrofuran. The reaction mixture is heated for 6.5 hours at 125–130° while the pressure is maintained at 180–220 lb./sq. in. by acetylene injection. From the dark-colored reaction mixture there is obtained by distillation, 52.2 parts of vinyl N,N-dibutyldithiocarbamate distilling at 162–165°/6–8 mm. ($n_D^{25}$1.5437).

Example VII

A mixture of 77.4 parts of dibutylamine and 45.6 parts of carbon disulfide is charged into a pressure bomb. The mixture is heated for 6.1 hours at 120° C. under an acetylene pressure of 180–230 lb./sq. in. On distilling the reaction mixture, there is obtained 68 parts of vinyl N,N-dibutyldithiocarbamate, B. P. 147–148/5 mm., $n_D^{25}$1.5548.

This example illustrates the preparation of an N,N-disubstituted vinyl dithiocarbamate in the absence of solvent for the amine and under essentially anhydrous conditions.

Example VIII

A mixture of 4.28 parts vinyl N,N-dibutyldithiocarbamate, 4.28 parts benzene, and 0.8 part $\alpha,\alpha'$-azodiisobutyronitrile is heated at 80° for 15.2 hours at 7700–8500 atmospheres. The benzene is then removed from the reaction mixture, leaving solid residue of vinyl N,N-dibutyldithiocarbamate polymer having a molecular weight of 2300 (boiling point elevation in benzene). The polymer can be pressed at 50° into limp, orientable films.

Example IX

A solution containing 80.0 parts chloroprene, 20.0 parts vinyl dibutyldithiocarbamate, 4.0 parts Nancy wood rosin, and 0.34 part dodecyl mercaptan is emulsified at room temperature in a solution containing 157.0 parts water, 0.95 part sodium hydroxide, 0.60 part "Daxad" 11 (formaldehyde/sodium naphthalene sulfonate condensation product) and 0.60 part potassium persulfate. The emulsion is stirred slowly and heated under a blanket of nitrogen to a temperature of 40°. The temperature of the emulsion is maintained at 40° for 45 minutes by external heating and then is raised to 45° and held at this temperature for 2.3 hours. During this time the specific gravity of the emulsion rises from 0.970 to 1.045, owing to copolymerization of chloroprene and vinyl dibutyldithiocarbamate. The polymerization is stopped at this point by addition of 13 parts of a mixture prepared by emulsifying a solution containing 0.4 part phenothiazine, 0.4 part p-tert. butyl catechol, and 70.4 parts benzene in a solution containing 120 parts water, 1.2 parts sodium "Lorol" sulfate, and 0.6 part "Daxad" 11.

Coagulation of the polymer-containing emulsion or latex in ethanol gives 2.95 parts of an elastic product per 10.5 parts of latex. Analyses indicate that the product contains 4.56% sulfur and 32.3% chlorine, which corresponds to a copolymer of chloroprene and vinyl dibutyldithiocarbamate containing 7-8 mole per cent of the latter component.

The chloroprene/vinyl dibutyldithiocarbamate copolymer is more resistant toward heat and light than polychloroprene. Thus, rayon fabric impregnated with the copolymer latex and heated for 2 or 4 hours at 125° or exposed for 7 hours to ultraviolet light is discolored and tendered much less than rayon fabric treated with a polychloroprene latex under the same conditions. The degree of tendering of the rayon is a measure of the amount of HCl evolved when the polymers are heated or exposed to ultra violet light and thus gives a qualitative indication of the stability of the polymer toward heat and light.

It will be understood that the above examples are merely illustrative and that the present invention is broadly applicable to the preparation of vinyl dithiocarbamates from acetylene, carbon disulfide, and secondary amines of the type described.

The amines adapted for use in this invention are represented by the formula

wherein R and R' may be, individually, monovalent hydrocarbon, oxahydrocarbon or thiahydrocarbon radicals in which the carbon attached to the nitrogen is attached to other atoms by single bonds, only, or, taken together, may be a divalent hydrocarbon, oxahydrocarbon, or thiahydrocarbon radical in which both carbon atoms attached to the nitrogen are aliphatic in character. Typical examples of amines which may be used in addition to those already cited are dimethylamine, methylethylamine, dioctylamine, dioctadecylamine, dicyclohexylamine, dibenzylamine,

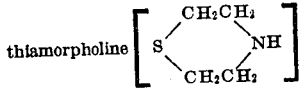

di-(β-ethoxyethylamine), and di-(β-thioethylethylamine).

The ratio of amine to carbon disulfide may be varied widely, but for most economical results these reactants are used in substantially equimolecular amounts. It is desirable to pressure the reaction mixture with acetylene throughout the reaction, which means that acetylene will be present in excess, particularly during the latter part of the reaction. Necessary precautions must of course be taken when operating under pressure in view of the hazards attendant upon the use of acetylene under pressure. While the reaction obviously will be carried out under superatmospheric pressure, the magnitude of the pressure is not critical, a moderate pressure of 100-300 lb./sq. in. being suitable but the pressure may vary from this widely.

Although no added catalyst is necessary, improved results are obtained in some instances by adding a small amount, e. g., 0.1-5% based on the weight of the amine, of an alkaline material, such as the hydroxides and carbonates of the alkali and alkaline earth metals.

The best results are obtained by operating under substantially anhydrous conditions even though, as Example I shows, the reaction will take place in the presence of water. It is preferred to use an inert, organic solvent for the amine such as tetrahydrofuran or dimethyl formamide but, nevertheless, excellent yields are obtained in the complete absence of solvent for the amine as Example VII demonstrates. A temperature of 100-140° C. is preferred because within this temperature range and under substantially anhydrous conditions the reaction proceeds most effectively, usually being complete within 10 hours. As indicated in Example III, the reaction takes place at temperatures as low as 75° C. but at a slower rate, the rate being correspondingly slower as the temperature is lowered still further. Temperatures above 140° C. may be used but are not preferred because of wide reactions and danger of decomposition.

The vinyl dithiocarbamates of this invention can be polymerized by the known methods for the polymerization of vinyl compounds. Suitable polymerization initiators are organic peroxides, persulfates, and the azonitriles described in Hunt U. S. Patent 2,471,959. In general, any compound capable of yielding unstable free radicals can be used as a polymerization initiator. The vinyl dithiocarbamates can be polymerized alone or in admixture with other polymerizable compounds, or with compounds susceptible to copolymerization. Examples of such compounds are olefins, e. g., ethylene and styrene; dienes, such as butadiene and chloroprene; vinyl esters, e. g., vinyl chloride, vinyl fluoride, and vinyl acetate; halogenated ethylenes, e. g., vinylidine chlforide, chlorotrifluoroethylene, and tetrafluoroethylene; acrylic and methacrylic compounds, e. g., ethyl acrylate, methyl methacrylate, and acrylonitrile; and maleic and fumaric compounds, e. g., maleic anhydride and ethyl fumarate. The vinyl dithiocarbamates can be copolymerized with each other or with one or more of the above-mentioned monomers.

The polymers of this invention are useful in making coating and adhesive compositions. They can also be used in rubber compositions. In these and other uses the polymers can be compounded with dyes, pigments, fillers, plasticizers, anti-oxidants, and other polymers. The polymers and copolymers of the vinyl dithiocarbamates can be hydrolyzed to polythiols which become insoluble on mild oxidation.

Aside from their use in making polymers, the vinyl dithiocarbamates can be used in the preparation of rubber chemicals and pesticides. For example, on hydrolysis with bases and metal salts they can be converted to the corresponding salts of dithiocarbamaic acids, which are useful as fungicides or rubber accelerators.

As many apparently widely different embodiments of this invention may be made without departing from the spirit and scope thereof, it is to be understood that the invention is not limited to the specific embodiments thereof except as defined in the appended claims.

The invention claimed is:
1. An N,N-disubstituted vinyl dithiocarbamate having the formula

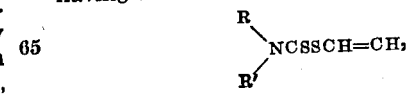

wherein R and R' represent radicals from the group consisting of, R and R' taken individually, monovalent hydrocarbon, oxahydrocarbon, and thiahydrocarbon radicals, in which the carbon attached to the nitrogen is attached to other atoms by single bonds only, and, R and R' taken together, divalent hydrocarbon, oxahydrocarbon, and thiahydrocarbon radicals in which the two carbon atoms attached to the nitrogen are both aliphatic in character.

2. A polymer of the compound recited in claim 1.

3. Vinyl N,N-dibutyldithiocarbamate.

4. Process of preparing an N,N-disubstituted vinyl dithiocarbamate which comprises reacting under superatmospheric pressure acetylene with a mixture of carbon disulfide and a secondary amine having the formula

wherein R and R' represent radicals from the group consisting of, R and R' taken individually, monovalent hydrocarbon, oxahydrocarbon, and thiahydrocarbon radicals in which the carbon attached to the nitrogen is aliphatic in character, and, R and R' taken together, divalent hydrocarbon, oxahydrocarbon, and thiahydrocarbon radicals in which the two carbons attached to the nitrogen are both attached to other atoms by single bonds only.

5. Process as set forth in claim 4 wherein said reaction is conducted under substantially anhydrous conditions.

6. Process as set forth in claim 5 wherein said reaction is conducted at a temperature of 100° C. to 140° C.

7. Process as set forth in claim 5 wherein said reaction is conducted in the presence of an inert, organic solvent for said amine.

8. Process as set forth in claim 6 wherein said reaction is conducted in the presence of an inert, organic solvent for said amine.

9. A polymer of vinyl N,N-dibutyldithiocarbamate.

CARLETON THOMAS HANDY.
JOHN C. SAUER.

REFERENCES CITED

The following references are of record in the file of this patent:

UNITED STATES PATENTS

| Number | Name | Date |
|---|---|---|
| 2,469,838 | Morris | May 10, 1949 |